(12) United States Patent
Rangan et al.

(10) Patent No.: US 10,317,230 B2
(45) Date of Patent: Jun. 11, 2019

(54) MACHINE LEARNING TRAVEL MANAGEMENT SYSTEM WITH WEARABLE DEVICE INTEGRATION

(71) Applicant: ACCENTURE GLOBAL SOLUTIONS LIMITED, Dublin (IE)

(72) Inventors: Trilok Rangan, Bangalore (IN); Chaitra Nagaraj, Bangalore (IN); Rahul Chaudhary, Lucknow (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 200 days.

(21) Appl. No.: 15/603,077

(22) Filed: May 23, 2017

(65) Prior Publication Data
US 2017/0343368 A1 Nov. 30, 2017

(30) Foreign Application Priority Data
May 31, 2016 (IN) .............................. 201641018604

(51) Int. Cl.
| | |
|---|---|
| *H04W 4/02* | (2018.01) |
| *H04W 4/21* | (2018.01) |
| *H04W 4/80* | (2018.01) |
| *G01C 21/20* | (2006.01) |
| *G01C 21/34* | (2006.01) |
| *G01C 21/36* | (2006.01) |

(Continued)

(52) U.S. Cl.
CPC ......... *G01C 21/3484* (2013.01); *G01C 21/20* (2013.01); *G01C 21/3608* (2013.01); *G01C 21/3667* (2013.01); *G06Q 50/14* (2013.01); *H04L 67/306* (2013.01); *H04W 4/02* (2013.01); *H04W 4/21* (2018.02); *H04W 4/80* (2018.02)

(58) Field of Classification Search
CPC G01C 21/3484; G01C 21/20; G01C 21/3608; G01C 21/3667; H04W 4/21; H04W 4/80; H04W 4/02; G06Q 50/14; H04L 67/306
See application file for complete search history.

(56) References Cited

U.S. PATENT DOCUMENTS

| | | | |
|---|---|---|---|
| 5,948,040 A | 9/1999 | Delorme et al. | |
| 2009/0267728 A1* | 10/2009 | Mayrand | G07C 9/00111 340/5.6 |

(Continued)

OTHER PUBLICATIONS

Umanets, A. et al.,"GuideMe—A Tourist Guide with a Recommender System and Social Interaction", Procedia Technology 17, 2014, pp. 407 to 414.

*Primary Examiner* — Aaron L Troost
(74) *Attorney, Agent, or Firm* — Mannava & Kang, P.C.

(57) ABSTRACT

A machine learning travel management system is operable to provide end-to-end travel solutions and bookings based on machine-learning-assisted choice and selection of travel destinations. Travel solutions may include travel destination choices, which in many instances is one of the most difficult decisions made by travelers. Additionally, the system may interact with active bands, which comprise wearable RFID devices. The wearable RFID devices may provide for identification and location determination to provide location-based services. Also, the system may include a mobile application that provides mapping of travel routes and waypoints, which can interact with location information determined based on the active bands.

20 Claims, 18 Drawing Sheets

(51) Int. Cl.
  *G06Q 50/14*  (2012.01)
  *H04L 29/08*  (2006.01)

(56) References Cited

U.S. PATENT DOCUMENTS

2012/0330935 A1* 12/2012 Huang ............... G06Q 30/0282
                                                707/723
2014/0114705 A1   4/2014 Bashvitz et al.
2015/0112910 A1   4/2015 Weir et al.
2015/0241238 A1   8/2015 Bass et al.
2015/0330805 A1* 11/2015 Cho .................. G01C 21/3484
                                                701/428

* cited by examiner

MACHINE LEARNING TRAVEL MANAGEMENT SYSTEM WITH WEARABLE DEVICE INTEGRATION

PRIORITY

The present application claims priority under 35 U.S.C. 119(a)-(d) to Indian patent application number 201641018604, having a filing date of May 31, 2016, the disclosure of which is hereby incorporated by reference in its entirety.

BACKGROUND

The way people have booked their travel plans has evolved over time. Initially, travel bookings were done by travel agents. Then, online bookings became popular through various web sites, which offer reviews as well as links for booking hotels, purchasing airline tickets, etc.

Also, people have changed the way they travel and what they do when they travel. For example, it is not uncommon for travelers to prefer to rent people's homes rather than stay in hotels. Also, travelers often share their travel experiences with friends through social media. Also, many travelers may prefer site seeing on their own instead of with a guide. Even with the availability of travel web sites, it is still time consuming and laborious to book travel plans, especially given the variation and ever changing travel habits of individuals.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
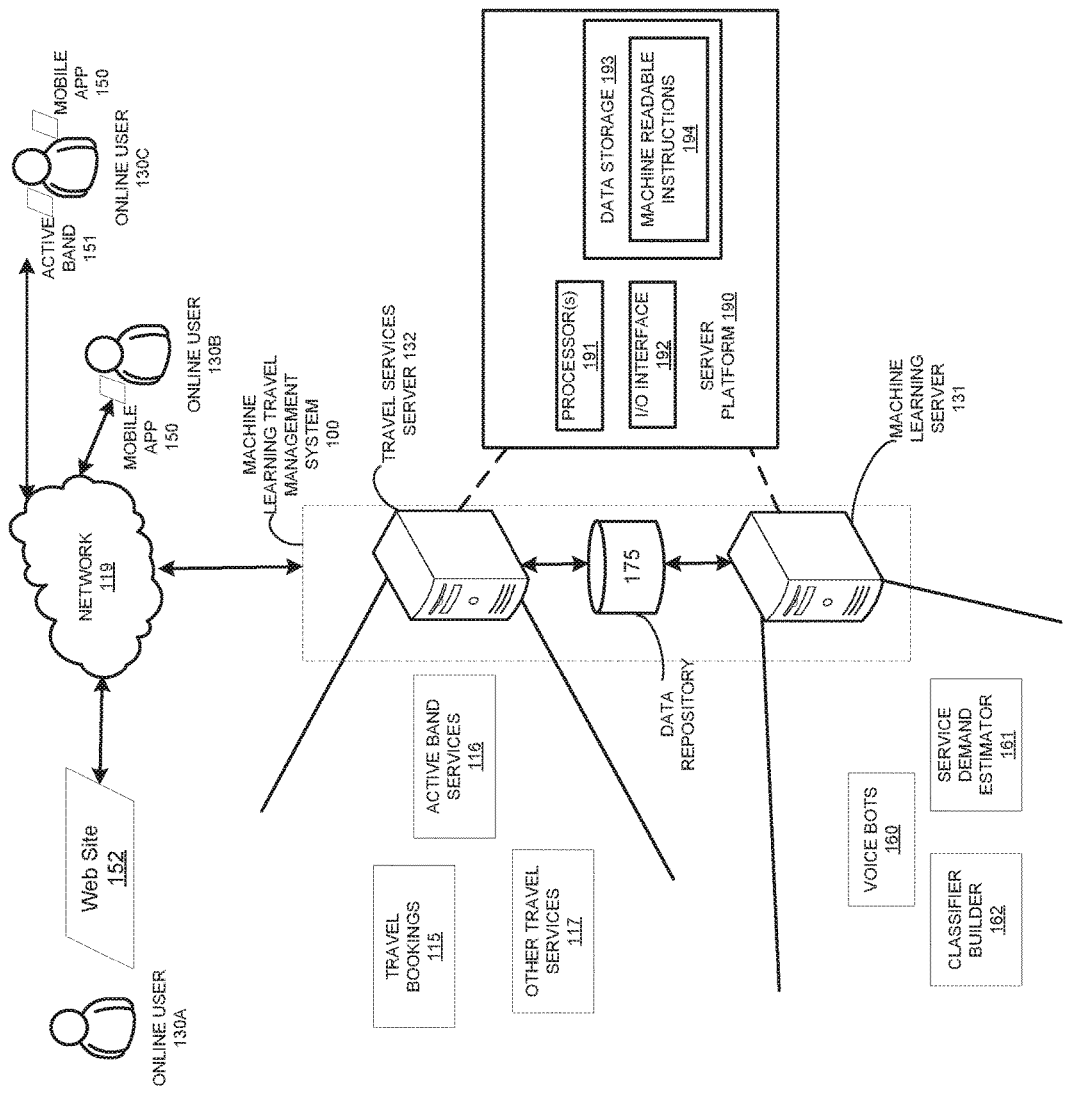
FIG. 1 shows a system diagram of a machine learning travel management system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure, a machine learning travel management system is operable to provide end-to-end travel offers and bookings based on machine-learning-assisted choice and selection of travel offers. Travel offers may include destination choices, which in many instances is one of the most difficult decisions made by travelers. Generating travel offers is automated, intelligent and dynamic. The travel offers may be personalized and customized based on preferences. Also, safety during travel may be considered when generating travel offers. For example, destinations may be selected based on language and medical services offered. Also, the system may provide for creation of interactive social communities and provide unique loyalty programs.

Additionally, the system may interact with active bands, which comprise wearable RFID devices. The wearable RFID devices may provide for identification and location determination to provide location-based services, including providing of coupons, loyalty programs, and other services during travel. Also, the system may include a mobile application that provides mapping of travel routes and waypoints, which can interact with location information determined based on the active bands.

According to an example of the present disclosure, data from a plurality of data sources is captured and collated and through machine learning and/or data mining techniques to identify data patterns. The captured data may be travel-related and may include social media data, demographics, user preferences, and/or other data. A query from a user may be received for travel information. For example, a query may be received for determining where to vacation. A travel solution may be determined based on the query, user preferences for the user and data patterns determined from the collated data. The travel solution may include one or more destinations, a travel itinerary including the destinations and travel arrangements that conform to the travel itinerary, such as flights, car rental, hotels, etc. The system may connect to online booking services or cloud travel services to automatically book the travel solution, including the travel arrangements.

The system may also communicate with mobile applications and electronic wearable devices, which may include RFID tags, to provide travel-related services at a destination. For example, the system may determine waypoints estimated to be of interest to the user at a travel destination of the travel solution based on the collated data. A waypoint may be a location, which may be for an activity, estimated to be of interest to the user. The system determines a travel route based on the waypoints. Through a mobile application executed on a user device such as a smartphone, a map may be displayed that includes the travel route and the waypoints on the travel route. The travel route and waypoints may be dynamic. For example, the travel route and waypoints may be modified as the user is detected at different waypoints, such as through the RFID wearable device or other location tracking mechanisms.

Also, the system may generate messages and offers through the mobile application that incentivizes the user to visit different waypoints. Accordingly, the system can provide gamification, such as a treasure hunt based user experience, for visiting different waypoints that are estimated to be of interest to the user based on the data mining of the collated data. For example, an offer may include a discount for goods or services offered at a waypoint that incentives a user to visit the waypoint. The offers may be geo-tagged for a micro-location and may be on previous history, such as if you are biker as determined by social media, you may get an offer to visit a bike store.

Once the user is detected at a waypoint, such as by an RFID reader detecting an active band worn by the user, additional waypoints may be determined that are based on interests of the user, such as waypoints for museums if the user is interested in visiting museums. The waypoints can be dynamically modified as the user is detected at different waypoints to further the treasure hunt based experience. In an example, the travel route is initially determined with 6-7 waypoints and may be shown as green destinations on a displayed travel route. Additional destinations may be determined and shown in red as the user travels, and the user may select a red destination to turn it to green and add it to the travel route. Additional destinations may be presented with offers to incentivize visits to the destinations. Once the user visits a destination, new destinations may be added and may be selected by the user to add to the travel route.

Furthermore, the system can determine waypoints that are micro-locations. A micro-location may be a location within a GPS coordinate. For example, waypoints on a travel route may be at different GPS coordinates. Micro-locations may be multiple locations within a single GPS coordinate. For example, a market may have multiple stalls within close proximity. The stalls may be in a single GPS coordinate because they are located close to each other. In an example, a distance between consecutive GPS coordinates may range from 60 feet to one mile. A market may have multiple stalls within that distance range. Each stall may have its own micro-location. The user may be tracked at the different micro-locations by RFID readers at the micro-locations reading the RFID tag in the active band or other device of the user. Based on the detection of the user at a micro-location, new micro-locations and incentives may be communicated to the user via the mobile application. A new travel route with new waypoints may be generated and displayed via the mobile application. The waypoints may include a new set of micro-locations and other waypoints. In an example, the system may store micro-location sub-maps for different waypoints. A micro-location sub-map may include a map of micro-locations within close proximity, such as within a single GPS coordinate. The micro-location sub-map may be transmitted to the mobile application for display to the user, and the user may use the micro-location sub-map to navigate to a micro-location on the map. The mobile application display a travel route to micro-locations in the sub-map that may be of interest to the user and may be modified as the user travels the route. The mobile application may track the user's movements within a micro-location sub-map based on detection by RFID readers at the micro-locations and based on direction of travel which may be determined based on a compass or other movement measurements performed by a mobile device hosting the mobile application.

FIG. 1 shows a diagram of a system 100, according to an example of the present disclosure. The system 100 is a machine learning travel management system. The system 100 in FIG. 1 may be implemented in a distributed manner across multiple computers (e.g., servers) and systems, or some (or all) components may be implemented on the same computer or server. Components on separate computers may use any suitable communications technique to transmit data (represented by the arrows) between one another. The system 100 may reside on the cloud and be offered as a cloud service.

The system 100 is referred to as machine learning because it may use machine learning and natural language processing functions to make predictions on user choices. In an example, the machine learning and natural language processing functions are used to generate voice bots which may understand user's spoken input (or other form of user input), determine context, and use the input and context to select travel offers to present to the user. It should be understood that the system 100 may include additional components and that one or more of the components described herein may be removed and/or modified without departing from a scope of the system 100.

The system 100 may include a travel services server 132, a machine learning server 131 and a data repository 175. The travel services server 132 and the machine learning server 131 include computers that provide functionalities described below for other devices. The data repository 175 may include a data storage system that allows data to be stored and retrieved. The travel services server 132 provides travel services to online users 130, for example, via network 119, which may include the Internet and/or other networks. The users 130 may interact with the system 100 via a web site 152 and/or a mobile application 150 to perform various operations as is discussed below. By way of example, user 130a interacts with the system 100 via web site 152 and the system 100 may generate and display a travel route to the user 130a via the web site 152. User 130b may interact with the system 100 via mobile app 150, and user 130c may interact with the system 100 via mobile app 150 and active band 151. The travel services provided by the travel services server 132 may include travel bookings 115, active band services 116 and other travel services 117. The travel bookings 115 may include providing travel offers for selection by the online user and booking of an accepted travel offer. The active band services 116 may include providing location-based travel services, which are further described below. For example, online user 130c may have an active band with an RFID tag (active or passive) that may be read at various locations and used to provide services, including coupons, to the online user 130c when traveling. Other online travel services may also be provided by the travel services server 132.

The machine learning server 131 may include a classifier builder 162 which may generate machine learning classifiers based on training sets and validation sets. For example, neural networks may be trained and validated to create the classifiers. In an example, machine learning and natural language processing functions are used to create voice bots 160 which may understand user's spoken input (or other form of user input), determine context, and use the input and context to select travel offers to present to the user. Service demand estimator 161 may make predictions on travel services needed by a user, such as car rentals, bicycle rentals, restaurant choices, site seeing choices, etc. The predictions may be based on historical analysis of travel data. The predictions may be determined from regression analysis of the collated data in the data repository 175.

The network 119 may include local area networks (LANs) and wide area networks (WANs), such as the Internet. The network 119 may include signal bearing mediums that may be controlled by software, applications and/or logic. The network 119 may include a combination of network elements to support data communication services. The network 119 may encompass wired and/or wireless network technologies.

Server platform 190 is an example of hardware that may be used for the travel services server 132 and the machine learning server 131. It should be understood that the server platform 190 may include additional components and that one or more of the components described herein may be removed and/or modified as is known to one of ordinary skill in the art.

The server platform 190 may include one or more processors 191, data storage 193, and an input/output (I/O) interface 192. The components of the server platform 190 are shown on a single computer or server as an example and in other examples the components may exist on multiple computers or servers. The server platform 190 may store data in the data storage 193 and/or may manage the storage of data stored in a separate computing device, for instance, through the I/O interface 192. The data storage 193 may include physical memory, a hard drive, an optical drive, a flash drive, an array of drives, or any combinations thereof, and may include volatile and/or non-volatile data storage. The data storage 193 may include a non-transitory computer readable medium that can store machine readable instructions 194 which are executable by the processor 191 to perform the functions of the travel services server 132 and the machine learning server 131. The data storage 193 may include one or more non-transitory computer readable mediums.

The processor 191, which may comprise a microprocessor, a micro-controller, an application specific integrated circuit (ASIC), Graphical Processing Unit (GPU) or the like, is to perform various processing functions of the respective server. The processing functions may include the functions and operations described above.

The I/O interface 192 includes a hardware and/or a software interface. The I/O interface 192 may be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable.

The data repository 175 may include a database comprised of database tables or another type of data storage system. The data repository 175 can be implemented as a standalone or distributed repository. The data repository 175 may store any data used by the system 100.

Figure 2A:
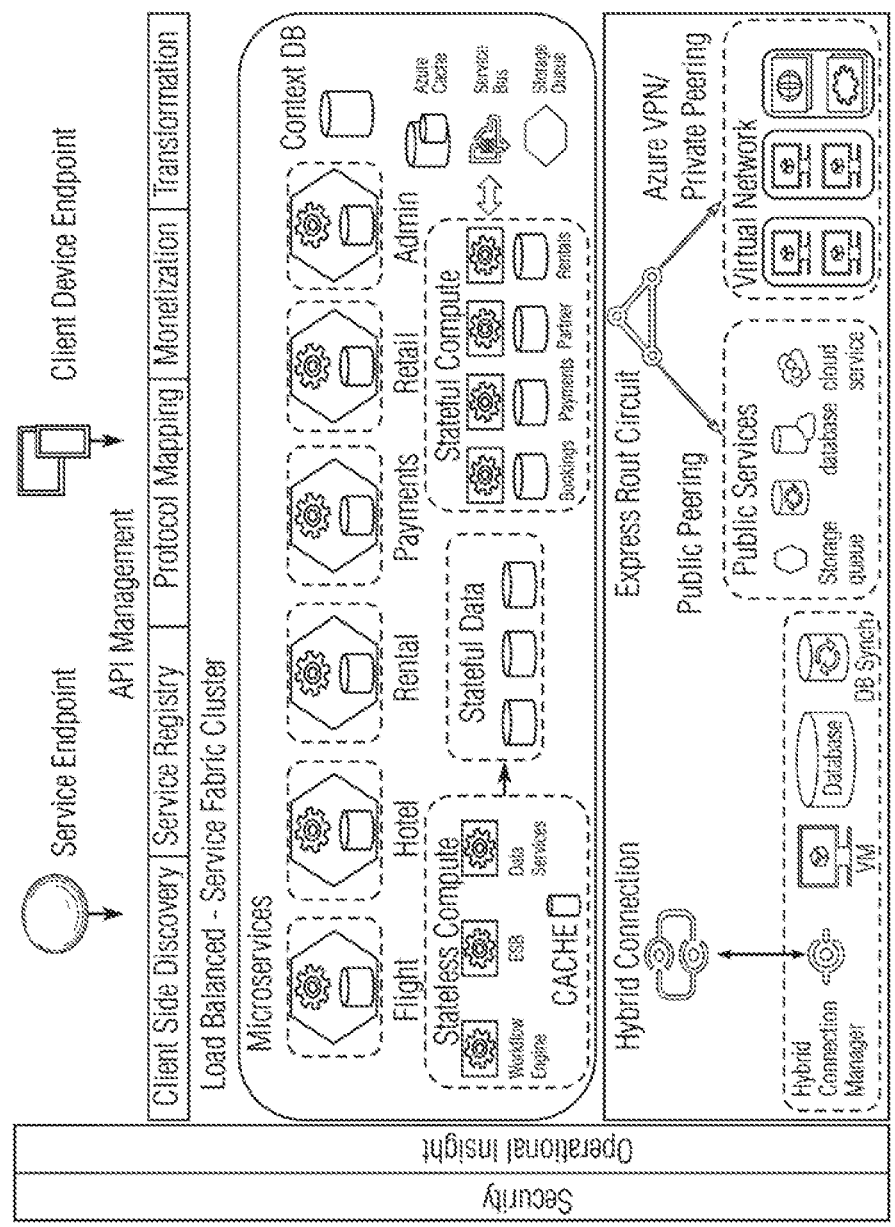
FIG. 2A shows an example of a software architecture of the system shown in FIG. 1.

FIG. 2A shows an example of a software architecture of the system 100 shown in FIG. 1. The software architecture may include operations for connecting to users, e.g., client device endpoints and service endpoints. Application program interfaces (APIs) may be managed and executed to connect to service endpoints which may provide various functions used by the system 100. Service endpoints may include cloud services or software applications that are remotely located and are accessed through the Internet or through other networks. In an example, the APIs may connect the system 100 to online booking services to automatically book a travel itinerary determined by the system 100. A load-balanced service fabric cluster provides microservices of the system 100, such offer generation and travel bookings, rentals, payments, etc. Stateless and/or stateful computing may be used to provide various microservices. Hybrid connections may be used to connect the web applications and mobile applications to on-premises computer resources behind a firewall. Express route circuits may be used to connect on-premises infrastructure to a service through a connectivity provider. The architecture may include security functions as well.

Figure 2B:
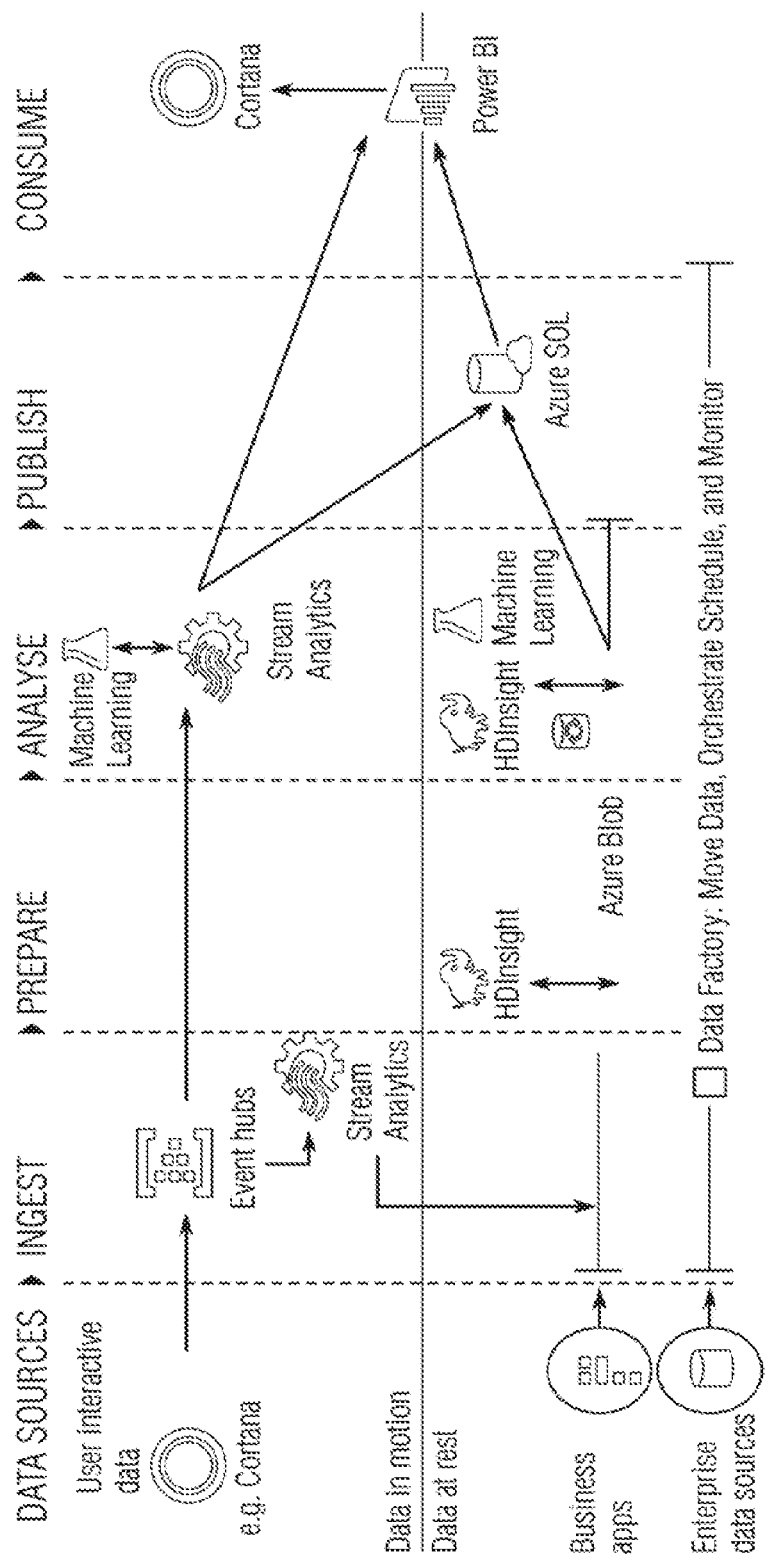
FIG. 2B shows an example of a data flow diagram for the system shown in FIG. 1.

FIG. 2B shows a data flow diagram for the system 100. User input, for example provided via a voice bot, is received at the system 100 and ingested or prepared and ingested for analysis. Also, data is captured and stored from a plurality of data sources. Data may be stored on the cloud. Data preparation may include moving data, executing data translations, orchestration, etc. Analysis may include machine learning analysis or some form of analytics to determine a travel solution, travel routes and new waypoints. The output of the services is published or presented to the user via the website 152 or mobile application 150.

Figure 2C:
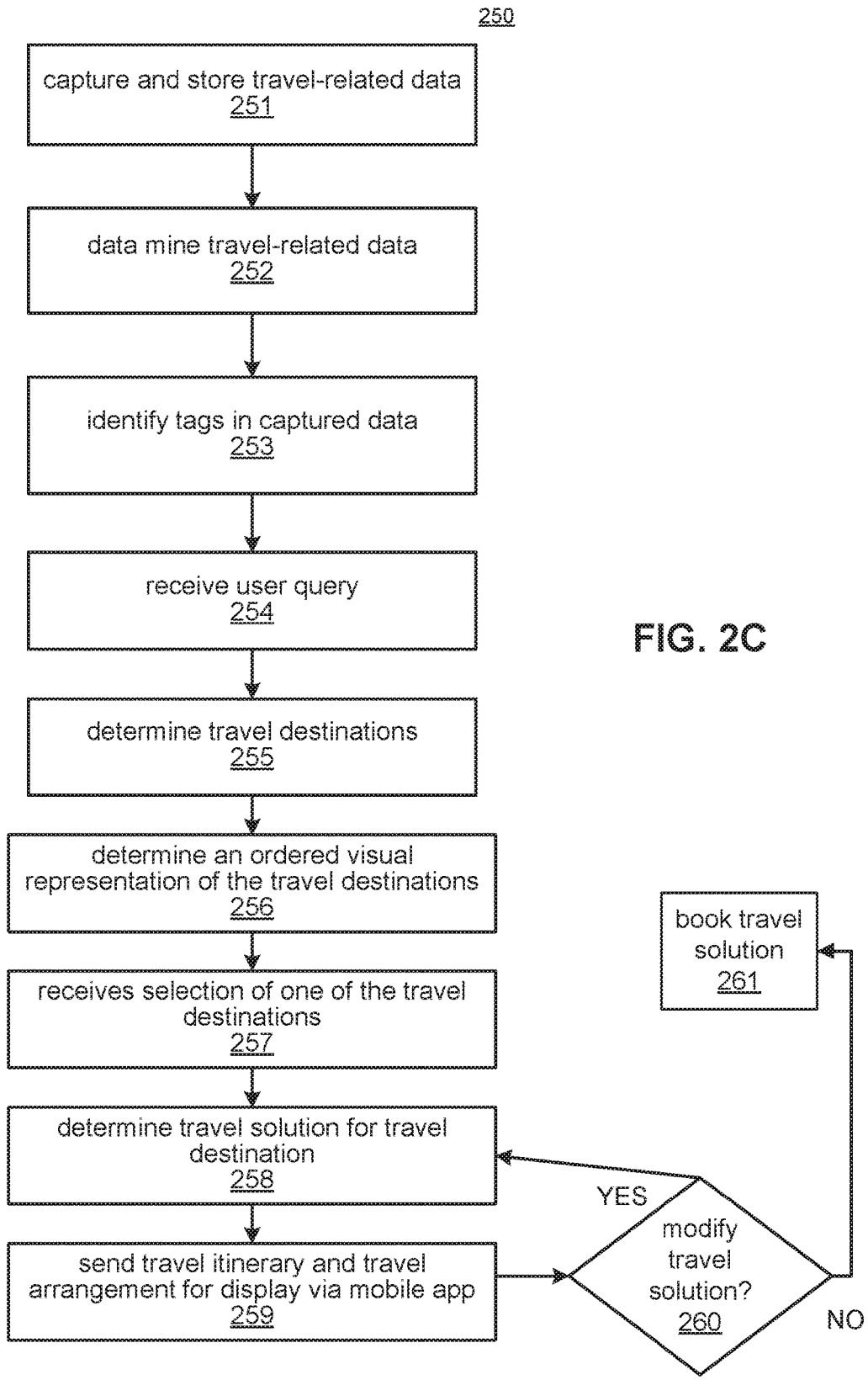
FIG. 2C shows a flow chart of a method for determining a travel solution for a user.

FIG. 2C shows a flow chart of a method 250 for determining a travel solution for a user. The method 250 is described by way of example as being performed by the system 100 but may be performed by other systems.

At 251 data is captured and stored in the data repository 175. The captured data may include travel-related data from a plurality of data sources. Travel-related data may include data about travel destinations and user interests that may be associated with the travel destinations and activities that may be performed at the destinations. The captured data may include social media data from social media applications, demographics of travelers, user preferences of travelers, etc. User preferences and user profile data may include data entered via mobile application 150 or web site 152 by users. The captured data may be collated in a data store, such as a data lake store of the data repository 175.

At 252, the system 100 may data mine the travel-related data in the data repository 175. Data mining may be continually or periodically performed as travel-related data is continually or periodically stored in the data repository 175. Data mining may be performed to determine data patterns in the travel-related data. An example of the data mining may include clustering, such as k-means clustering. The clustering may identify groups of users having related attributes and may be used to identify travel solutions for a user related to previous travel solutions provided for members of the group. For example, if a group of users is related by demographics, travel solutions previously used by members of the group may be used to determine a travel solution for another member of the group that is using the system 100 to determine a travel solution. Clustering and other types of conventional data mining techniques may be performed by the machine learning server 131 to determine data patterns in the captured data stored in the data repository 175. In an example, collating data may include capturing and storing data and may also include executing data mining operations to determine data patterns in the stored data.

At 253, the machine learning server 131 identifies tags in the captured data. The tags may include identifiers or other types of meta data that specifies attributes of the captured data. For example, social media data may include tags of likes of users or tags identifying topics in the most recent trends, which may be related to current events. The tags may be stored with the captured data and may be used to weight query results generated by the system 100 as is further discussed below.

At 254, the system 100 receives a user query for a travel solution. The user query may be received via the mobile application 150 of the web site 152. The user query may be received via one of the voice bots 160, and the machine learning server 131 executes natural language processing on the user query to determine a context of the query. Known natural language processing may be performed to remove stop words and determine context of the query. Cortana® by Microsoft® may be used for executing natural language processing on a user query to determine a context of the query.

At 255, the machine learning server 131 determines a set of travel destinations based on the query, a user profile of the user, the captured data, and the data mining of the captured data. For example, the natural language processing may determine keywords from the query such as vacation, New York City and summer. The query may be received through the mobile application 150. User profile information for the user may be determined, which may include information entered by the user through the mobile application and information from the captured data. The machine learning server 131 may determine a set of travel destinations that match the query based on the user profile information and clusters the user belongs to which were determined through the data mining. For example, the machine learning server 131 searches for previous itineraries of users in the same cluster as the user that include summer months and New York City and attributes determined from the user profile to determine a set of itineraries matching the query.

At 256, the machine learning server 131 determines an ordered visual representation of the set of travel destinations based on the weighted social media data. For example, the weighted data may include weights given to tags captured from social media data that represent trends and recency of trends identified in social media data. The machine learning server 131 determines whether the travel destinations include any of the weighted tags or whether the social media data or other data indicates the travel destinations are associated with any of the weighted tags. If so, the travel destinations may be displayed in an ordered fashion, similar to search results displayed by search engine, according to the weights. Travel destinations that are weighted higher because they may include destinations, activities, etc., associated with recent trends may be displayed closer to the top of a displayed list of the travel solutions. The travel destinations may be displayed in a graphical user interface of the mobile application 150 or via web site 152.

At 257, the machine learning server 131 receives a selection of one of the travel destinations, for example, via the mobile application 150. The user may select one of the travel destinations displayed through the mobile application 150. If the user decides that none of the travel destinations are satisfactory, the mobile application 150 may determine a new set of travel destinations which may be based on further user input.

At 258, travel solution may be determined for the selected travel destination. The travel solution may include a travel itinerary and travel arrangements, which may be determined based on previous trips to the travel destination by one or more users. At 259, the machine learning server 131 sends the travel itinerary and travel arrangements that conform to the travel itinerary for display via the mobile app 150. Travel arrangements that conform to the travel itinerary may include travel arrangements that have associated dates, times, and locations (intermediate and final destinations) that fit into the travel itinerary. Also, the availability and rates of various travel arrangements, such as airline flights, hotel accommodations, and rental cars, may be displayed for the user to select the final travel solution.

The user is presented with the travel itinerary and the travel arrangements via the mobile application 150, and the user determines whether to book the travel itinerary and the travel arrangements of the selected travel solution. At 260, the machine learning server 131 determines whether additional user input is received to modify the travel solution, such as any of the travel itinerary and the travel arrangements for the travel solution. If additional user input is received, such as via one of the voice bots 160, the machine learning server 131 determines a new travel solution (258) based at least on the additional user input. Then, the steps 259-260 are repeated. At 260, if the machine learning server 131 determines no additional user input is received to modify any of the travel itinerary and the travel arrangements of the selected travel solution, the machine learning server 131 may send the selected travel solution to the travel services server 132 to book the travel itinerary and the travel arrangements of the travel solution at 261. Bookings may be done via APIs to online booking services. For example, calls may be executed to the APIs to connect to at least one booking service to book the travel solution according to the travel itinerary and the travel arrangements in the travel solution.

Figure 2D:
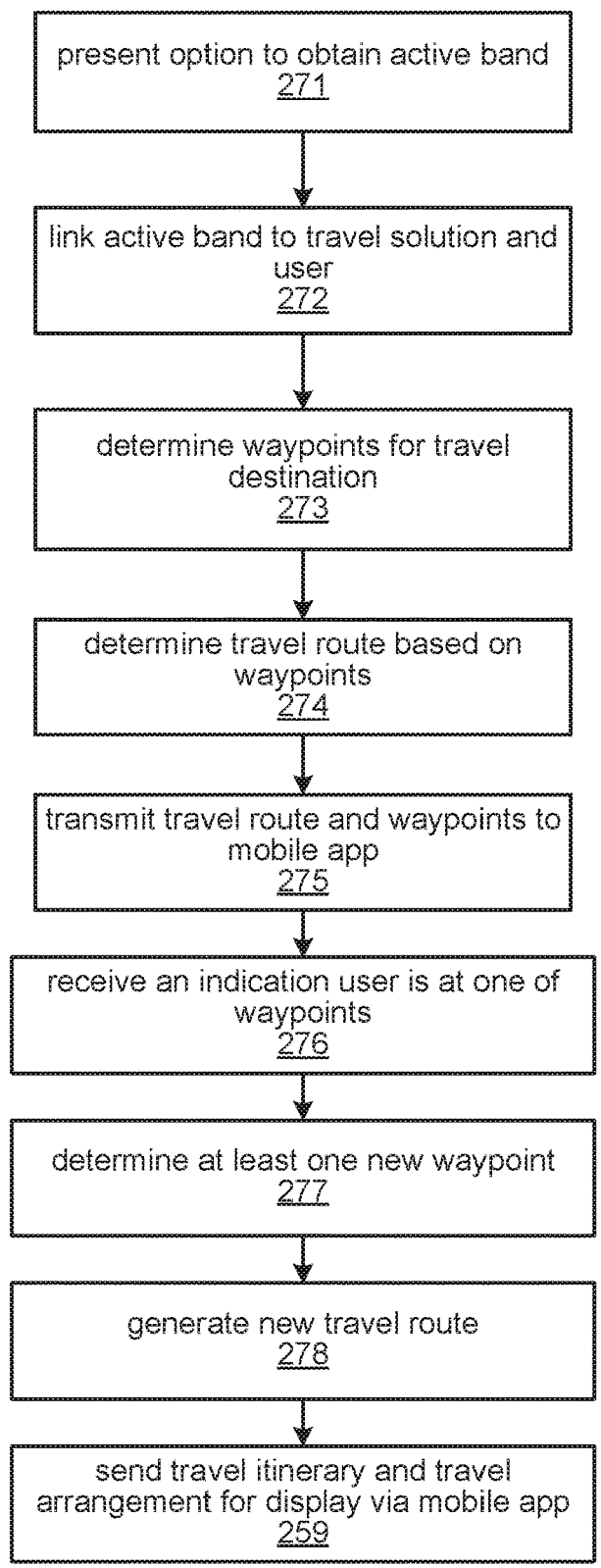
FIG. 2D shows a flow chart of a method for providing waypoints for a travel solution for a user.

FIG. 2D shows a flow chart of a method 270 for providing waypoints for a travel solution for a user. The method 270 is described by way of example as being performed by the system 100 but may be performed by other systems. The method 270 may be performed after the method 250 is performed to determine the travel solution. The method 270 may dynamically determine waypoints for a travel destination in the travel solution.

At 271, after the travel solution is determined in the method 250, an option is presented to the user to obtain an active band for the travel solution. For example, the option is presented via the mobile app 150 or the web site 152. The active band may include a wearable RFID tag.

At 272, if the user selects the option to obtain the active band, the active band is linked to the travel solution and the user. For example, the RFID tag may be programmed with a unique ID, and a record is stored in the data repository 175 that associates the unique ID of the active band with the user's travel solution and the user profile of the user. Then, the user receives the active band. There may be multiple ways for the user to obtain the active band. The active band may be picked up at a designated location or shipped to the user.

At 273, the system 100 determines waypoints for the travel destination. The waypoints may be determined based on data mining or machine learning that detects patterns in historical data for the user and the travel destination and based on preferences of the user. The waypoints may be determined by analysis of the collated data for other users similar to the user, e.g., having the same demographics and based on the user's data and preferences and the likes and interests of the user.

At 274, the system 100 determines a travel route based on the waypoints. The travel route may be determined by selecting a map for the travel destination. For example, if the travel destination is New York City, a map of Manhattan is retrieved from the data repository 175. The waypoints are located and pinned on the map, and the travel route is determined that includes the waypoints.

At 275, the system 100 transmits the travel route and the waypoints to the user, such as to the mobile app 150. The mobile app 150 displays the travel route to the user on the mobile device.

At 276, the system 100 receives an indication the user is at one of the waypoints. In an example, the RFID tag is read by a reader at a waypoint. An indication may be transmitted from a device at the waypoint, via a network, to the system 100 that the user is at the waypoint. The mobile app 150 or another device at the waypoint may transmit a message with the indication to the system 100 via the network. In another example, the user's location is tracked via global positioning system (GPS) to determine whether the user is at a waypoint, and the mobile app 150 sends the location of the user to the system 100.

At 277, at least one new waypoint that is not currently on the travel route is determined, and, at 278, a new travel route including a new set of waypoints comprising at least one new waypoint and at least one of the waypoints in the previous travel route is generated by the system 100 for the user. At 279, the new travel route is sent to the mobile app 150. The mobile app 150 displays the new travel route and the new set of waypoints on the map.

For example, at 277, to determine at least new waypoint, the system 100 may identify waypoints that are near the current location of the user, which may be the last waypoint where the user was detected. To identify waypoints that are near the current location, the system 100 may have a database of waypoints and their locations, and may identify waypoints that are within a predetermined distance of the current location of the user. The system 100 may filter the set of close-by way points based on user preferences and likes, and based on analysis of the collated data for other users similar to the user, e.g., having the same demographics. For example, a subset of the close-by waypoints may be selected for the new travel route based on user preferences and an analysis of historic travel-related data, and the new travel route may be transmitted to the mobile app 150 for display to the user. In an example, after determining the subset of the close-by waypoints, the subset of the close-by waypoints may be presented to the user with offers, and the user may select one or more of the displayed waypoints to be added to a new travel route. According to an example, a subset of the waypoints in the new travel route may include micro-locations. A sub-map may be determined for a set of micro-locations and transmitted from the system 100 to the mobile app 150 when the user is determined to be at a GPS coordinate for the set of micro-locations. The mobile app 150 can display the micro-locations on the sub-map and a walking travel route to each of the micro-locations. The user may be detected at a micro-location if the active band is read by an RFID reader at the micro-location, and new micro-locations may be determined and presented to the user that may be of interest. Also, a new travel route may be determined and displayed in response to selection of new micro-location waypoints.

Additionally, purchases may be made with the travel band if a payment authorization, such as credit card authorization, is linked to the RFID tag in the system 100. Transactions may be transmitted with the RFID tag to the system 100 to make purchases and track user behavior. Also, new offers may be generated based on tracked behavior. The offers may be presented to the user via mobile app 150 and may be associated with micro-location way points that can be selected and added to the travel route. The method 270 may be repeated as needed. For example, as the user travels to different waypoints, the user may be presented with new potential waypoints that are estimated to be of interest to the user and which may be selected for creating a new travel route.

FIGS. 3A-E illustrate examples of screen shots that may be generated in the website 152 or mobile app 150. Operations described above that are performed via the mobile app 150 may also be performed via the web site 152. In an example, one or more of the screen shots of FIGS. 3A-E may be presented to the user to determine a travel destination for a travel solution during the method 250.

Figure 3A:
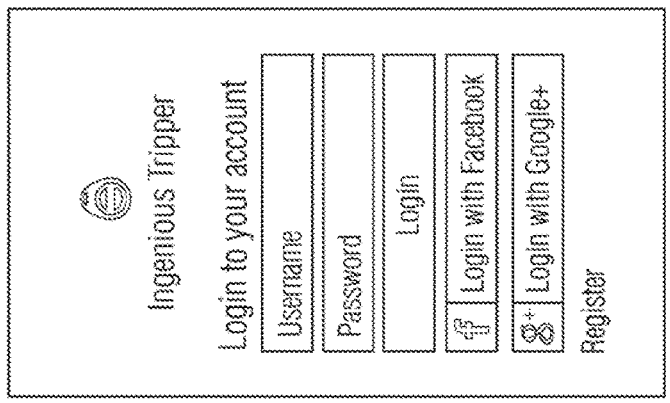
FIGS. 3A-E illustrate examples of screen shots that may be generated in a website or mobile application.
Figure 3B:
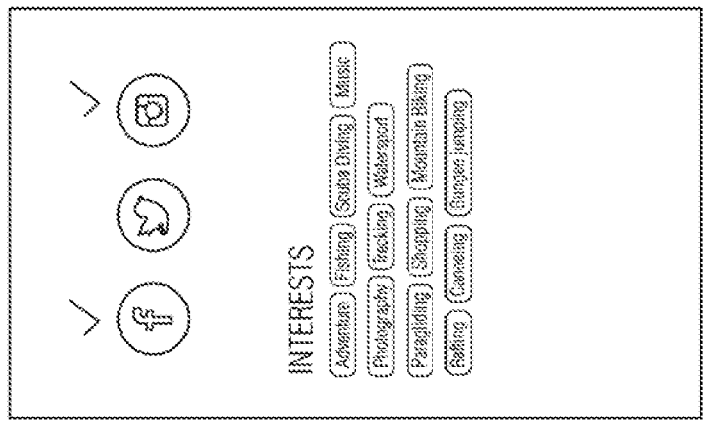
Figure 3C:
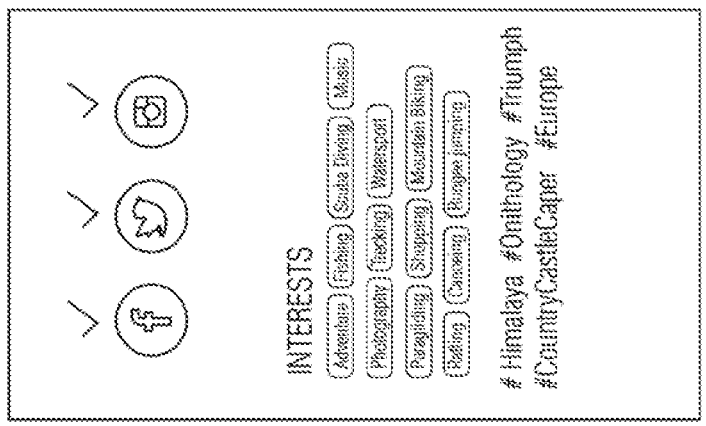

FIG. 3A shows an example for a login screen. The user may enter a name and password to login. FIG. 3B shows an example where the user enters preferences, such as interests. The interests and other preferences may be used to determine travel offers. Interests may also be determined from social media applications such as FACEBOOK, INSTAGRAM, TWITTER, etc. FIG. 3C shows additional preferences determined from the user's TWITTER account.

Figure 3D:
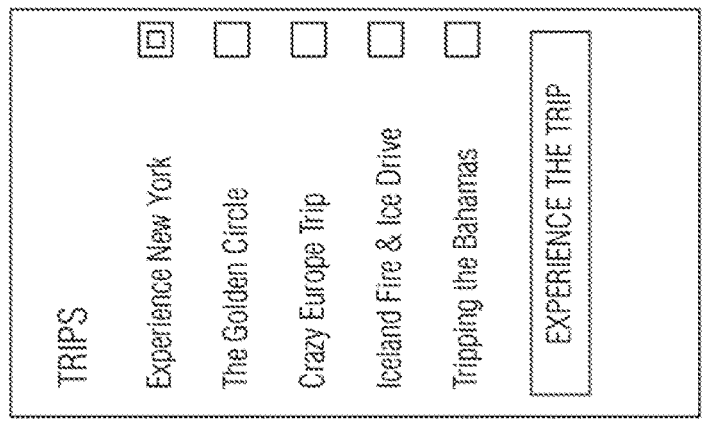
Figure 3E:
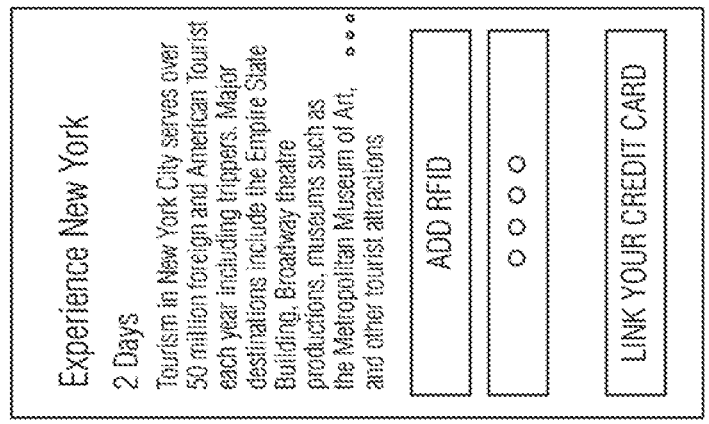

In the phase where the travel solution is being determined, the system 100 may select a destination based on user preferences and/or a user query, which may be received via one of the voice bots 160. FIG. 3D shows an example of destinations that may be selected based on user preferences and presented to the user. The user, for example, selects New York. FIG. 3E shows that the user may be presented with the option of adding an active band. The system 100 may interact with the active band, which comprises a wearable RFID device. The active band may provide for identification and location determination to provide location-based services, including providing of coupons and other services during travel. For example, RFID readers may be provided at various locations, and the user may present their active band to be read by an RFID reader to receive location-based services. The user may also have the option of linking their credit card, so rentals or other purchases may be performed though the mobile app 150 or via the active band 151.

FIGS. 4A-E show examples of screen shots for mapping and active band services provided by the system 100. In an example, one or more of the screen shots of FIGS. 4A-E may be presented to the user during the method 270.

Figure 4A:
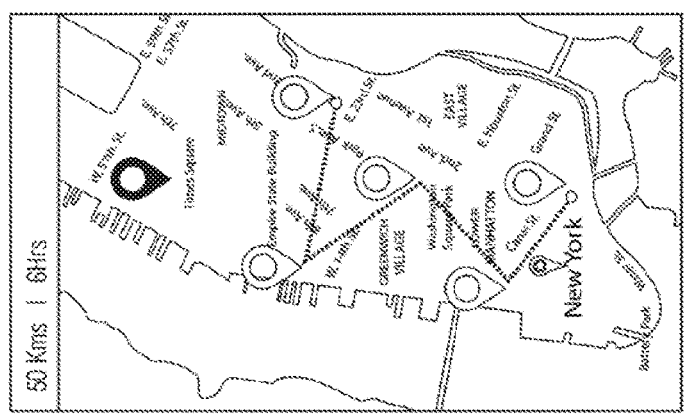
FIGS. 4A-E show examples of screen shots for mapping and active band services.
Figure 4B:
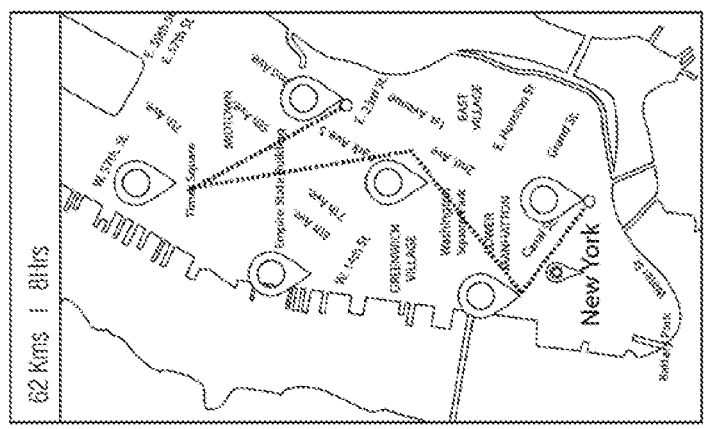

For example, the mobile app 150 may display a map with waypoints that represents places of interest to be visited by the user, such as shown in FIG. 4A. The waypoints may be determined as part of the travel solution and may be displayed to the user via the mobile app 150 at the travel destination of the travel solution. Also, a travel route may be generated and shown to provide the shortest path between waypoints.

Figure 4C:
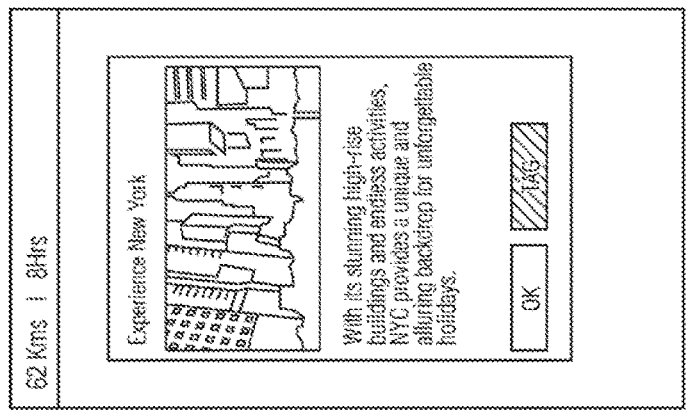
Figure 4D:
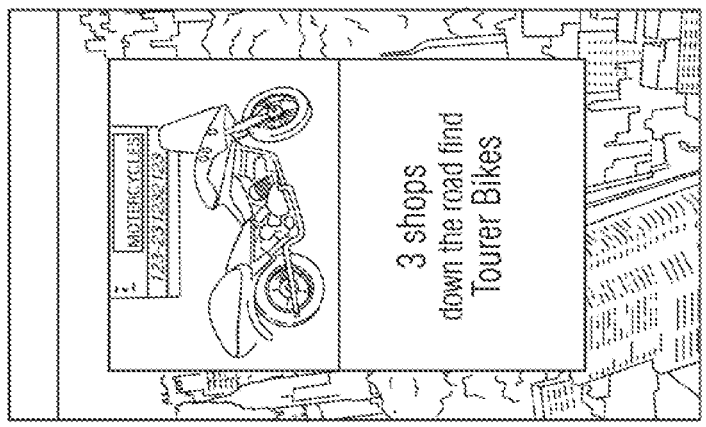
Figure 4E:
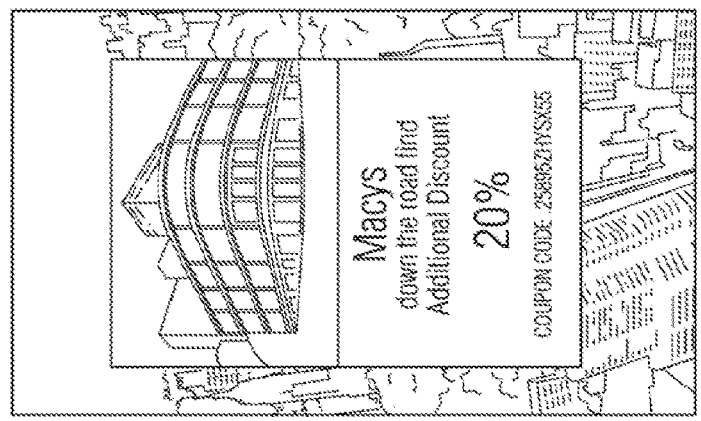

As discussed above with respect to the method 270, new waypoints may be dynamically added and a new travel route may be created with the new waypoints. The system 100 determines a new waypoint in Times Square that may be of interest to the user, and the new waypoint may be displayed differently, such as in a different color, from the waypoints that already on the travel route. For example, the new waypoint in Times Square may be displayed in red, and the user may click on the new waypoint to determine more information about it or to select it to add to the travel route. FIG. 43 shows that the user selects the new waypoint in Times Square to be added to the travel route. The system 100 automatically adds it to the travel route, creating a new travel route with the new waypoint. As shown in FIG. 4C, the system 100 may provide descriptions of waypoints or potential new waypoints, which may be tagged by the user and visited. FIGS. 4D-E show examples of the mobile app 150 presenting information for new waypoints that may be added to the travel route. For example, FIG. 4D shows that tourer bike rentals are available at new potential close-by waypoints. FIG. 4E shows an example of an offer that may be presented for a new potential close-by waypoint. For example, a 20% discount is offered for a retailer at the new potential close-by waypoint. The new potential close-by waypoints may be determined based on the user's current location which may be determined from the active band 151, and also based on preferences and data mining techniques and artificial intelligence predictions. In an example, regression modeling may be used to determine the demand for goods or services associated with available offers for new potential close-by waypoints, and one or more of the new potential close-by waypoints may be selected for display to the user based on the demand determined from the regression modeling.

Figure 5:
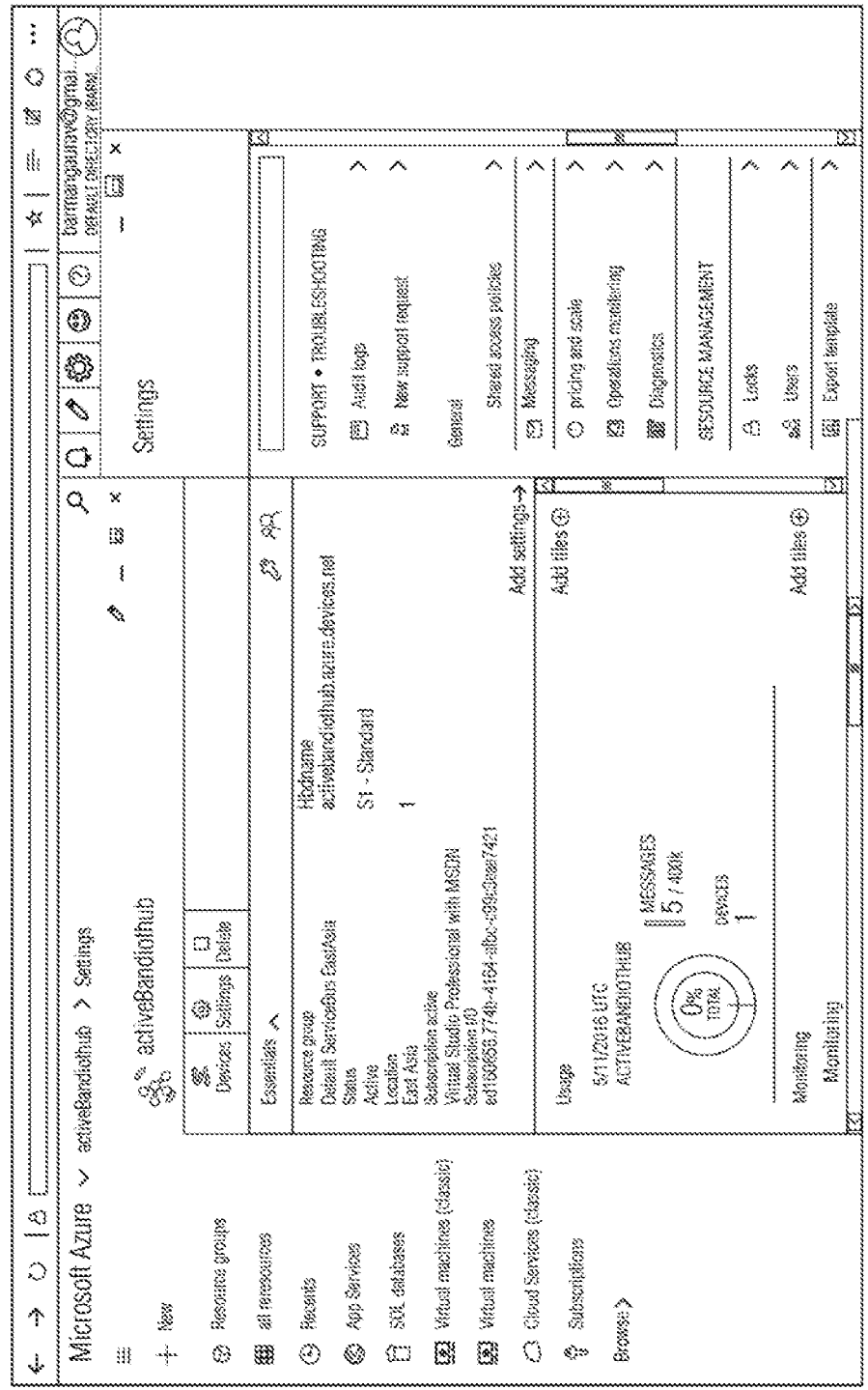
FIG. 5 shows an example of a screen shot for active band management.

FIG. 5 shows an example of a screen shot that may be displayed in the mobile app 150 or web site 152 for active band management and services. For example, a user may use the screen shown in figure to control monitoring usage, messaging, pricing, etc., associated with the active band.

Figure 6:
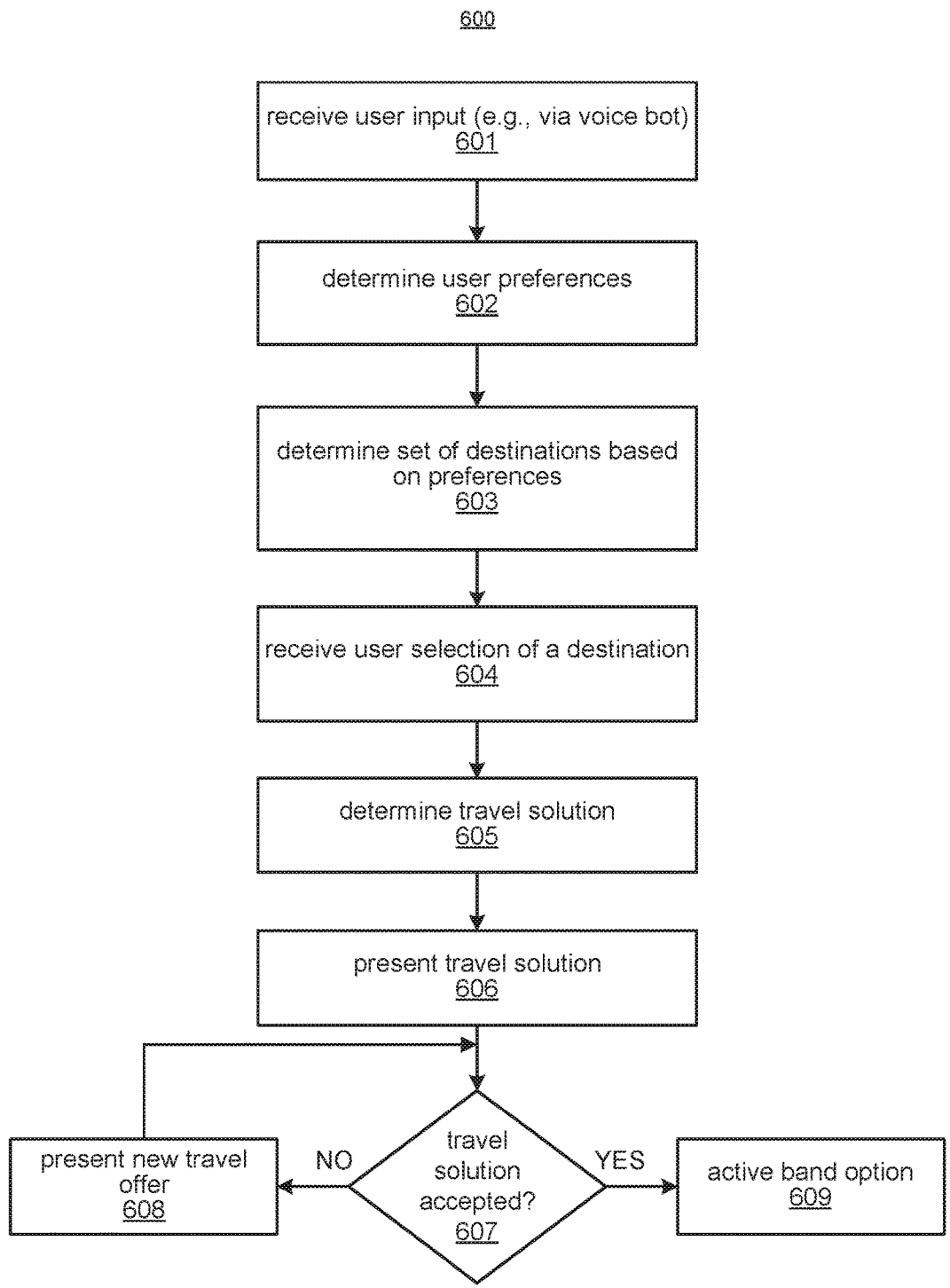
FIGS. 6-7 show methods, according to examples of the present disclosure.

FIG. 6 shows an example of a method 600 that may be performed by the system 100. The method 600 is similar to the method 250 discussed above but provides additional details for selecting the final travel solution. At 601, user input is received, for example, via a voice bot of the voice bots 160. At 602, user preferences are determined. Preferences may be determined from the user's social media accounts and/or user input. At 603, a set of destinations are determined based on the preferences. At 604, a user selection of a destination from the set is received. At 605, a travel solution is determined for the destination and based on the preferences. The travel solution may include airfare, hotel, and other suitable travel services. At 606, the travel solution is presented. At 607, a determination is made as to whether the travel solution is accepted. If not, another travel solution is presented at 608. The travel solution may be for the same destination but may be modified, such as different hotel or airline or some other modification. Alternatively, other destinations may be displayed for selection of a new destination and generation of a new travel solution for the selected destination. If the travel solution is accepted, at 609, the user is presented with an option to receive an active band for the trip. The user may purchase the active band in an example. The active band may be used to provide additional services during the trip.

Figure 7:
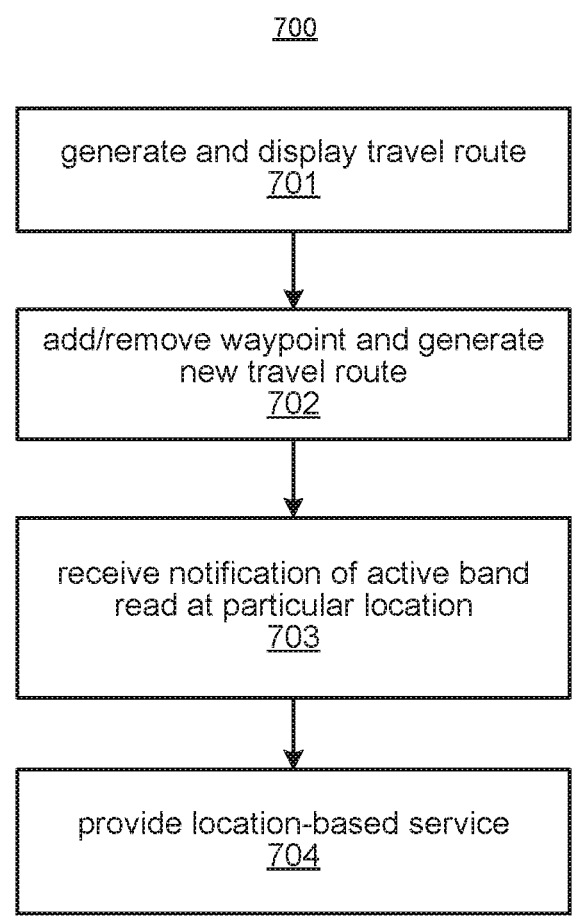

FIG. 7 illustrates a method 700 that is associated with the active band and mapping services provided by the system 100. The method 700 is similar to the method 270 discussed above. At 701, a travel route is generated and displayed on a map, including waypoints that are of interest to the user. At 702, a waypoint may be added or removed and a new travel route is generated. In an example, the system 100 predicts waypoints that may be of interest to the user and the user has the option of adding the waypoints.

RFID readers may be located along the travel route. At 703, the system 100 receives notification that the user's active band was read at an RFID reader at a particular location. At 704, location-based services are provided, such as provided a coupon, or information about rentals, or any information that may be useful to the user at their present or future waypoints.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A machine learning travel management system comprising:
   at least one processor;
   at least one non-transitory computer readable medium storing machine readable instructions executed by the at least one processor to:
   capture data including social media data, demographics, and user preferences of users related to traveling;
   create a user profile of a user from the captured data;
   determine data patterns in the captured data;
   identify tags in the social media data and determine weights for the social media data based on the tags;
   receive travel-related user input via a voice bat, wherein the voice bot executes natural language processing on the travel-related user input to determine a travel-related query;
   determine a set of travel destinations based on the query, the user profile and the data patterns in the captured data;
   determine an ordered visual representation of the set of travel destinations based on the weighted social media data for presenting the set of travel destinations to the user via a graphical user interface;
   receive a selection of a travel destination from the set of travel destinations;
   determine and present a travel solution based on the travel destination and the user preferences; wherein the travel solution includes a travel itinerary and travel arrangements that conform to the travel itinerary;
   determine whether the travel solution is accepted;
   in response to determining the travel solution is not accepted, generate a new travel solution based on additional user input received via the voice bat;
   in response to determining the travel solution is accepted,
      execute a call for at least one application program interface to connect to at least one booking service to book the travel solution according to the travel itinerary and the travel arrangements in the travel solution; and
      provide an option for the user to obtain an active band, wherein the active band comprises a radio-frequency identification (RFID) wearable device;
   in response to the user selecting the option to obtain the active band, link the travel solution to the active band;
   determine waypoints based on the travel itinerary and the travel arrangements;
   determine a travel route based on the waypoints;
   transmit the travel route and the waypoints to a mobile application of a user, wherein the mobile application generates a map on a display of a mobile device executing the mobile application, and the map displays the travel route and the waypoints on the travel route;
   receive an indication the user is at one of the waypoints, wherein the indication is generated in response to an RFID reader reading the active band at the one of the waypoints;
   determine a new waypoint that is not currently on the travel route and that is predicted to be of interest to the user based on the user preferences of the user, the captured data; and the indication that the user is at one of the waypoints;
   generate a new travel route including a new set of waypoints comprising the new waypoint and at least one of the waypoints; and
   transmit the new travel route and the new set of waypoints to the mobile application, wherein the mobile application displays the new travel route and the new set of waypoints on the map.

2. The system of claim 1, wherein the at least one processor is to:
in response to receiving the indication the user is at the one of the waypoints, provide a location-based service via the mobile application to the user based on a location of the one of the waypoints.

3. The system of claim 2, wherein the location-based service comprises:
a notification of micro-locations estimated to be of interest to the user that are within a GPS location of the one of the waypoints.

4. The system of claim 3, wherein the notification includes offers to incentivize the user to go to the micro-locations.

5. The system of claim 3, wherein the at least one processor is to:
receive an indication the user is at one of the micro-locations, wherein the indication the user is at one of the micro-locations is generated in response to an RFID reader at the one of the micro-locations reading the active band;
determine a second new set of waypoints including the micro-locations; and
transmit a second new travel route including the second new set of waypoints to the mobile application for display to the user via the mobile application.

6. The system of claim 3, wherein the at least one processor is to:
determine a micro-location sub-map including the micro-locations in the new second set of waypoints; and
transmit the micro-location sub-map to the mobile application, wherein the mobile application displays the micro-locations in the micro-location sub-map and a travel route to the micro-locations in the micro-location sub-map.

7. The system of claim 1, wherein to link the active band, the at least one processor stores a unique identifier of the active band with information for the travel solution, and to receive an indication the user is at one of the waypoints, the at least one processor receives an indication that the unique identifier of an RFID tag of the RFID wearable device was read at the one of the waypoints.

8. The system of claim 1, wherein to create the user profile, the at least one processor is to:
determine likes and interests of the user from the social media data,
wherein the mobile application displays the likes and interests of the user, receives modifications to the likes and interests, and sends the modifications to the at least one processor; and
create the user profile with the modified likes and interests.

9. The system of claim 1, wherein the ordered visual representation of the set of travel destinations are displayed in the mobile application, and the mobile application receives a selection of one of the displayed travel destinations for the travel solution.

10. The system of claim 1, wherein the at least one processor is to determine the data patterns according to at least one of clustering and regression modeling of the captured data.

11. A method comprising:
collating, by at least one server, travel-related data for a plurality of users;
determining, by the at least one server, a travel destination for a user of the plurality of users, wherein the determining of the travel destination comprises:
determining a set of travel destinations based on user preferences and data patterns determined from the collated travel-related data;
presenting the set of travel destinations in a graphical user interface of a mobile application; and
receiving a user selection via the graphical user interface, of one of the travel destinations in the set;
determining and presenting a travel solution for the selected travel destination, wherein the travel solution includes a travel itinerary and travel arrangements that conform to the travel itinerary;
automatically booking, by the at least one server, the travel solution;
determining, by the at least one server, waypoints estimated to be of interest to the user at the travel destination of the travel solution; and
dynamically modifying the waypoints and a travel route for the waypoints based on the user preferences, the collated travel-related data, and an indication that the user is at one of the waypoints, wherein the travel route including the dynamically modifying the waypoints are displayed on map in the graphical user interface of the mobile application.

12. The method of claim 11, comprising:
in response to receiving the indication the user is at the one of the waypoints, providing a location-based service via the mobile application to the user based on a location of one of the waypoints.

13. The method of claim 12, wherein the location-based service comprises:
a notification of micro-locations estimated to be of interest to the user that are within a GPS location of the one of the waypoints.

14. The method of claim 13, wherein the notification includes offers to incentivize the user to go to the micro-locations.

15. The method of claim 11, comprising:
creating a user profile of the user, wherein creating the user profile comprises:
determining likes and interests of the user from social media data,
wherein the mobile application displays the likes and interests of the user, receives modifications to the likes and interests, and sends the modifications to the at least one server; and
creating the user profile with the modified likes and interests, wherein the user profile is used to determine the set of travel destinations.

16. A travel solution system comprising:
at least one server including at least one processor; and
a mobile application executed by a mobile device in communication with the at least one server via a network,
wherein the at least one server is to:
capture data including social media data, demographics, and user preferences of users related to traveling;
create a user profile of a user from the captured data;
determine data patterns in the captured data;
identify tags in the social media data and determine weights for the social media data based on the tags;
determine a set of travel destinations based on at least one of the user profile, the tags, and the data patterns in the captured data;

display in the mobile application the set of travel destinations, wherein an order of displaying the set of destinations is determined from the weighted social media data;

receive a selection of a travel destination from the set of travel destinations from the mobile application;

determine and present a travel solution based on the travel destination and the user preferences, wherein the travel solution includes a travel itinerary and travel arrangements that conform to the travel itinerary;

determine whether the travel solution is accepted;

in response to determining the travel solution is not accepted, generate a new travel solution based on additional user input received via the mobile application;

in response to determining the travel solution is accepted, execute a call for at least one application program interface to connect to at least one booking service to book the travel solution according to the travel itinerary and the travel arrangements in the travel solution; and provide an option for the user to obtain an active band, wherein the active band comprises an RFID wearable device; and in response to the user selecting the option to obtain the active band, link the travel solution to the active band.

17. The travel solution system of claim 16, wherein the at least one server is to:

determine waypoints estimated to be of interest to the user at the travel destination of the travel solution; and dynamically modify the waypoints and a travel route for the waypoints based on the user preferences and data patterns determined from the captured data.

18. The travel solution system of claim 17, wherein the waypoints are dynamically modified in response to detecting the user at one of the waypoints.

19. The travel solution system of claim 18, wherein the dynamically modified waypoints comprise micro-locations within a GPS location of the one of the waypoints.

20. The travel solution system of claim 18, wherein the at least one server is to detect the user at one of the waypoints based on receiving an indication that the active band of the user was detected at the one of the waypoints by an RFID reader.

* * * * *

UNITED STATES PATENT AND TRADEMARK OFFICE
CERTIFICATE OF CORRECTION

PATENT NO. : 10,317,230 B2
APPLICATION NO. : 15/603077
DATED : June 11, 2019
INVENTOR(S) : Trilok Rangan et al.

Page 1 of 1

It is certified that error appears in the above-identified patent and that said Letters Patent is hereby corrected as shown below:

In the Claims

In Column 12, Line 10, Claim 1, "bat" should read "bot".
In Column 12, Line 31, Claim 1, "bat" should read "bot".

Signed and Sealed this
Twenty-third Day of July, 2019

Andrei Iancu
*Director of the United States Patent and Trademark Office*